United States Patent
Voigt et al.

[11] Patent Number: 5,101,789
[45] Date of Patent: Apr. 7, 1992

[54] METHOD FOR PREVENTING KNOCKING IN A SPARK-IGNITED INTERNAL COMBUSTION ENGINE HAVING A PLURALITY OF COMBUSTION CHAMBERS

[75] Inventors: Dieter Voigt, Wolfsburg; Andreas Künne, Söllingen, both of Fed. Rep. of Germany

[73] Assignee: Volkswagen AG, Fed. Rep. of Germany

[21] Appl. No.: 728,124

[22] Filed: Jul. 10, 1991

[30] Foreign Application Priority Data

Jul. 23, 1990 [DE] Fed. Rep. of Germany ....... 4023378

[51] Int. Cl.$^5$ ............................................. F02P 5/145
[52] U.S. Cl. ................................................... 123/425
[58] Field of Search ............................. 123/425, 435; 364/431.05, 431.08

[56] References Cited

U.S. PATENT DOCUMENTS

| | | | |
|---|---|---|---|
| 4,275,692 | 6/1981 | Takeda et al. ................. | 123/425 X |
| 4,331,117 | 5/1982 | Ginsburgh ....................... | 123/425 |
| 4,483,295 | 11/1984 | Iida ................................. | 123/425 |
| 4,508,079 | 4/1985 | Komurasaki et al. ............ | 123/425 |
| 4,700,677 | 10/1987 | Bonitz et al. .................... | 123/425 |
| 4,802,455 | 2/1989 | Abo ................................ | 123/425 |
| 4,993,371 | 2/1991 | McDougal et al. ............... | 123/425 |
| 5,027,775 | 7/1991 | Iwata .............................. | 123/425 |

FOREIGN PATENT DOCUMENTS

| | | | |
|---|---|---|---|
| 0193896 | 9/1986 | European Pat. Off. ........... | 123/425 |
| 2930540 | 5/1988 | Fed. Rep. of Germany . | |
| 0043270 | 3/1986 | Japan ............................... | 123/425 |
| 0001760 | 1/1988 | Japan ............................... | 123/425 |

Primary Examiner—Willis R. Wolfe
Attorney, Agent, or Firm—Brumbaugh, Graves, Donohue & Raymond

[57] ABSTRACT

Undesired knocking in a spark-ignited internal combustion engine is avoided by selectively retarding ignition for individual combustion chambers the first time knocking occurs to identify the knocking combustion chamber and storing the identified combustion chamber in a memory so that, upon later knocking, shifts in the ignition timing of individual combustion chambers can be made utilizing the known ignition sequence.

2 Claims, 1 Drawing Sheet

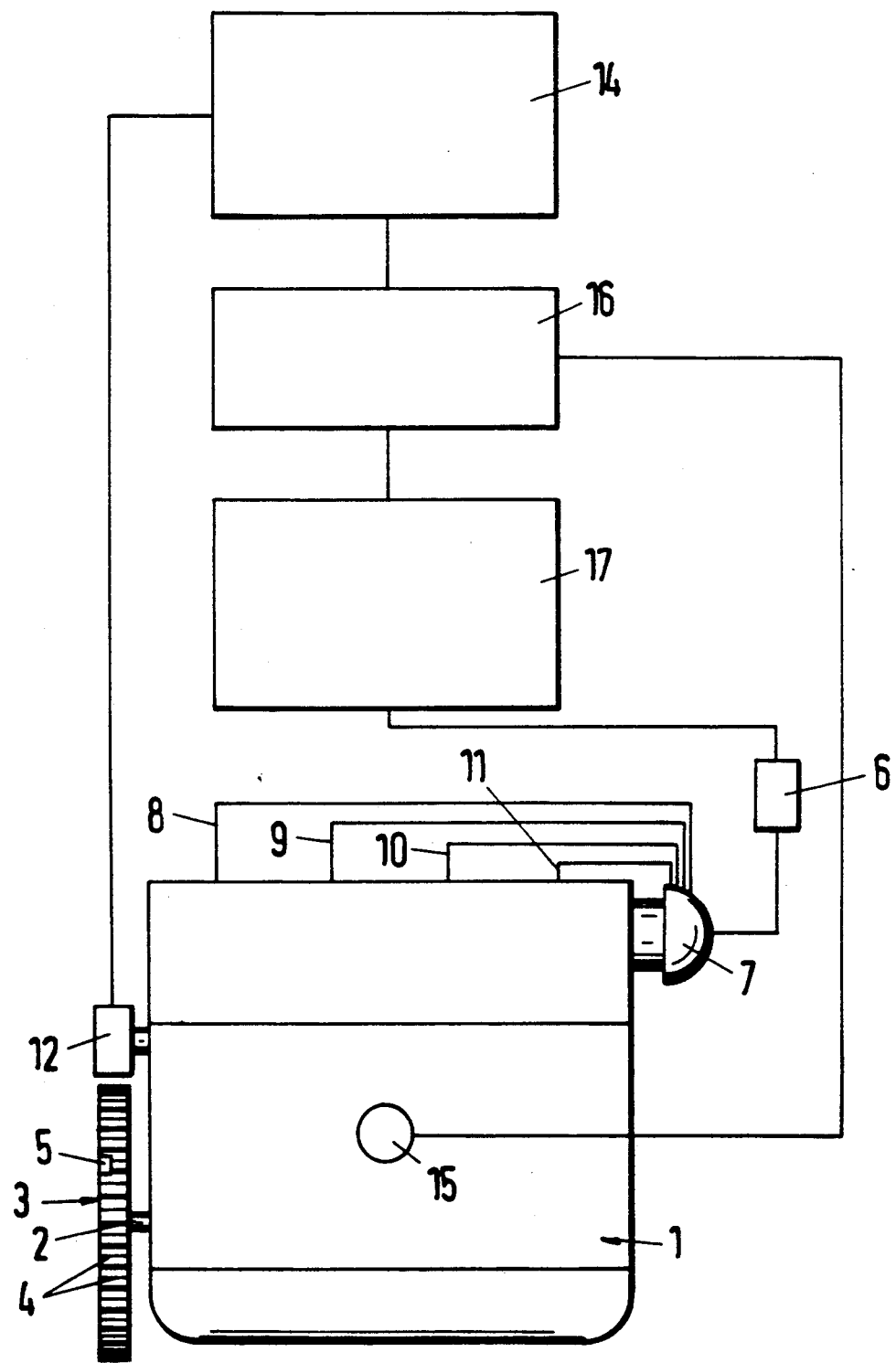

METHOD FOR PREVENTING KNOCKING IN A SPARK-IGNITED INTERNAL COMBUSTION ENGINE HAVING A PLURALITY OF COMBUSTION CHAMBERS

BACKGROUND OF THE INVENTION

This invention relates to methods for preventing knocking in spark-ignited internal combustion engines.

German Patent No. 29 30 540 discloses a method for adapting a load- and rpm-dependent ignition angle control curve to particular prevailing conditions in an internal combustion engine by applying correction signals which are generated the first time knocking occurs. For a predetermined relatively long period of engine operation, the thus-corrected control curve is used to determine the ignition angle so that the occurrence of knocking within this predetermined operating time is avoided with some certainty. In this prior art method, the adapted control curve determines the ignition angle for all the combustion chambers of the engine.

SUMMARY OF THE INVENTION

Accordingly, it is an object of the present invention to provide a method for preventing knocking in a spark-ignited internal combustion engine which overcomes the disadvantages of the prior art.

Another object of the invention is to provide a method for preventing knocking which, by a simple procedure, makes it possible to control knocking for individual combustion chambers without using a plurality of top dead-center signal transducers.

These and other objects of the invention are attained by varying the ignition timing for individual combustion chambers separately when knocking first occurs until the knocking disappears and, upon a later occurrence of knocking, using the adjustment information obtained in response to the initial knocking to adjust the ignition timing of the combustion chambers based on the ignition sequence.

Accordingly, the method of the invention operates so that the first time knocking signals occur, for instance, after each time the engine is started, an observation is made as to when the knocking signals are eliminated by selectively retarding the ignition time for individual combustion chambers. In other words, the combustion chamber producing the knocking is identified based on the ignition sequence and adjustment of ignition timing to eliminate knocking is carried out for that combustion chamber. The result of this combustion chamber identification is then stored in a memory and, if knocking occurs at a later time, the particular combustion chamber exhibiting knocking is recognized by reference to this combustion chamber identification, based on the known ignition sequence, and its ignition timing is varied.

For instance, in an engine having two pistons that are at top dead center simultaneously, the ignition timing of the combustion chambers containing those pistons is alternately retarded until knocking disappears in order to identify the knocking piston the first time knocking occurs. As soon as the knocking disappears, the particular combustion chamber in which retarding of ignition timing has just been performed is identified as the knocking combustion chamber.

BRIEF DESCRIPTION OF THE DRAWING

Further objects and advantages of the invention will be apparent from a reading of the following description in conjunction with the accompanying drawing which is a schematic block diagram illustrating a typical control arrangement for carrying out the method of the invention.

DESCRIPTION OF PREFERRED EMBODIMENT

In the representative arrangement shown in the drawing, a four-cylinder internal combustion engine 1 has a crankshaft 2 carrying a disk 3 which may, for example, be a component of a flywheel. The disk 3 has a series of angle markings 4 and a crankshaft marking 5 which is associated with the top dead center position of a piston in one of the four combustion chambers of the engine 1.

The engine 1 is the type having externally controlled ignition, with an ignition coil 6 common to all the combustion chambers and an ignition distributor 7, which furnishes voltage pulses generated by the ignition coil 6 through four ignition cables 8,9,10 and 11 to corresponding spark plugs for the individual combustion chambers.

Closely spaced from the rim of the disk 3, which is made of magnetic material, is a magnetic detector 12 which supplies rpm signals generated by the angle markings 6, and a crankshaft angle signal generated by the top dead center marking 5, to a processing unit 14. A knocking sensor 15, which is of conventional design, is mounted as an additional transducer on the housing of the engine 1, and provides knocking signals to a knocking control unit 16.

As soon as a knocking signal is received by the knocking control system 16, the system transmits a signal to an ignition angle correction unit 17, which in turn causes a retarding of the ignition timing. This shift of ignition timing is converted, through the ignition distributor 7, into chronologically successive shifts in ignition timing for the individual combustion chambers in accordance with the ignition sequence, so that the particular combustion chamber at which ignition is being retarded at the moment the knocking signals disappear is identified as the knocking combustion chamber. The result of this identification step is likewise stored in memory in the unit 17.

If knocking then occurs again, the particular knocking combustion chamber is recognized by reference to this combustion chamber identification and the known ignition sequence, and its ignition timing is varied until the knocking disappears.

With this invention, a simple method is provided which makes it possible to perform knocking control by a simple arrangement and with minimal influence on the mode of operation of the engine.

Although the invention has been described herein with reference to a specific embodiment, many modifications and variations therein will readily occur to those skilled in the art. Accordingly, all such variations and modifications are included within the intended scope of the invention.

We claim:

1. A method for preventing knocking in a spark-ignited internal combustion engine having an ignition distributor and a plurality of combustion chambers with a plurality of simultaneous top dead-center positions by retarding ignition timing as a function of knocking signals from a knocking sensor comprising selectively retarding the ignition timing in individual combustion chambers in accordance with the ignition sequence the first time knocking occurs until knocking disappears to identify a knocking combustion chamber and, upon a later occurrence of knocking signals, selectively retarding the ignition in a previously identified combustion chamber in accordance with the ignition sequence to counteract the knocking.

2. A method according to claim 1 wherein the internal combustion engine has a plurality of combustion chambers in which the pistons are located at top dead center simultaneously comprising alternately retarding the ignition times in the plurality of combustion chambers the first time knocking occurs until the knocking disappears.

* * * * *